Oct. 21, 1952     E. F. MILLER     2,614,796
ROTOR CONSTRUCTION
Filed March 30, 1950
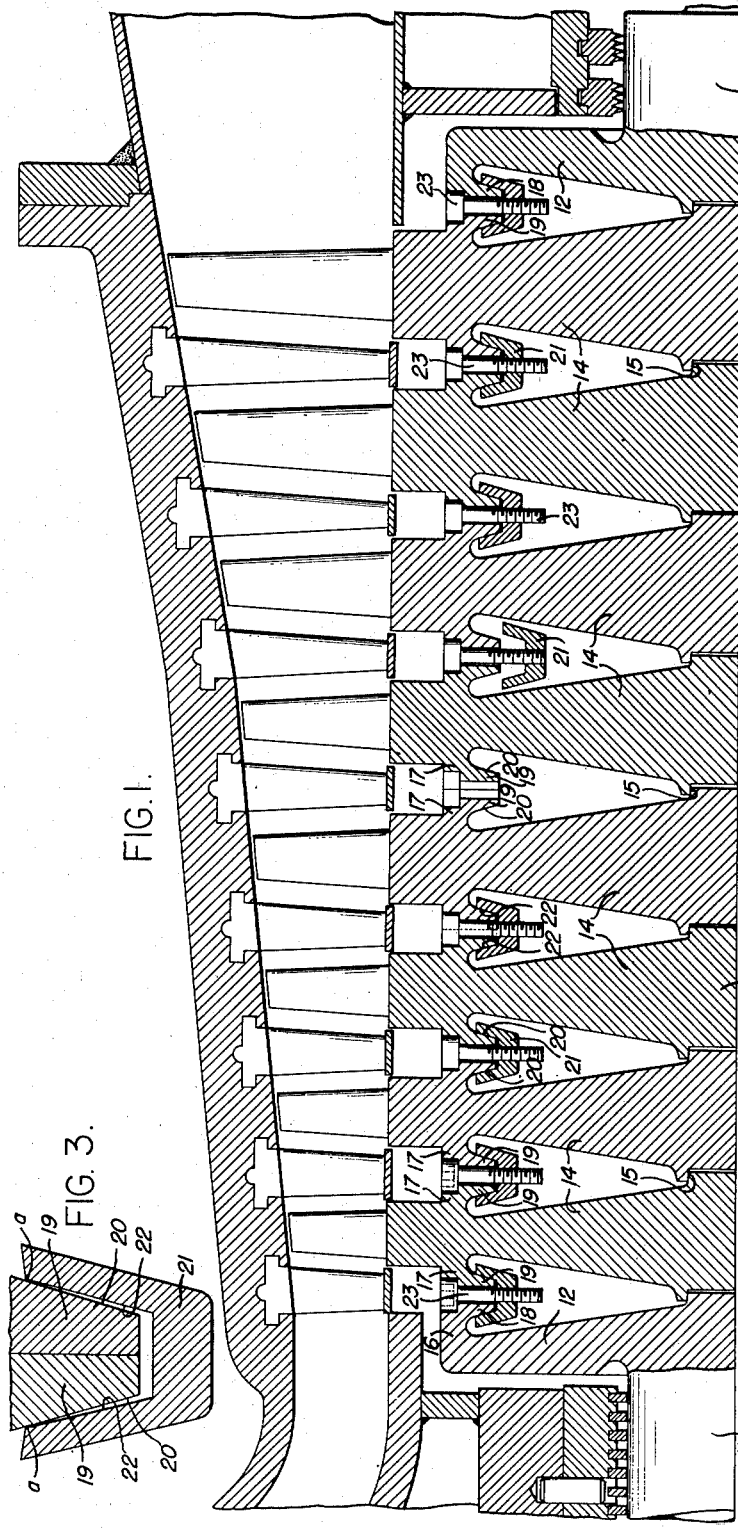
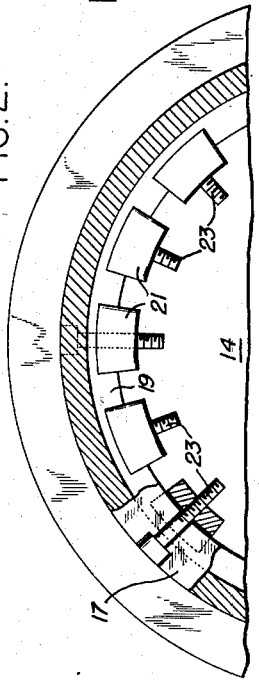
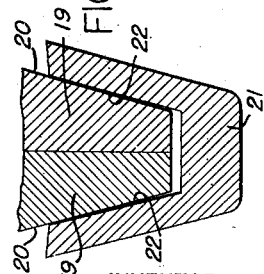
INVENTOR
Ernest F. Miller
BY
ATTORNEY Patented Oct. 21, 1952

2,614,796

UNITED STATES PATENT OFFICE 2,614,796

ROTOR CONSTRUCTION

Ernest F. Miller, Lansdowne, Pa., assignor to Westinghouse Electric Corporation, East Pittsburgh, Pa., a corporation of Pennsylvania Application March 30, 1950, Serial No. 152,948

3 Claims. (Cl. 253—39)

1

The invention relates to a compressor or turbine and it has for its object to provide a rotor therefor made up of shaft-end and intermediate discs having rims, which are held in lateral contact by the spring action of wedging clamps to constitute a composite drum structure.

Rotors made from high-strength alloys, particularly for high-temperature gas turbine application, may be made with more uniform and desirable properties if they are comprised by component parts small enough to permit thorough working of all the metal in the forging process, or, if cast, so that thermal strains are minimized and maximum uniform density is assured. Accordingly, the rotor of the present construction comprises end shafts, discs carried by the latter, and intermediate discs, the discs having rims which are wedged tight into lateral contact by interior segmental clamps, the arrangement being such that centrifugal force acting on the clamps promotes the wedging and spring clamping action.

The foregoing and other objects are effected by the invention as will be apparent from the following description and claims taken in connection with the accompanying drawings, forming a part of this application, in which:

Fig. 1 is a longitudinal sectional view of a turbine or compressor embodying features of the present invention;

Fig. 2 is a transverse sectional view showing the relationship of internal flanges and the clamping means therefor; and Figs. 3, 4 and 5 are exaggerated detail views illustrative of the clamp spring action.

In the drawing, there is shown a rotor, at 10, having end shafts 11 provided with discs 12. Intermediately of the shaft-end discs, there are disposed discs 14.

The discs 12 and 14, in addition to the central spigoted connections 15, have laterally-contacting rims 16 and 17 provided with contacting and inwardly-extending flanges 18 and 19. The contacting flanges 18 and 19 of each shaft-end disc and the adjacent intermediate disc and the contacting flanges 19, 19 of the intermediate discs have outwardly-diverginig outer surfaces 20, 20 with which cooperate segmental clamps 21, 21 formed for cooperation with the surfaces 20, 20 to wedge, with spring action, the flanges tightly in contact.

Preferably, each clamp 21 is of arcuate channel construction having outwardly-diverging inner surfaces 22, 22 cooperating with the flange surfaces 20, 20 to produce the aforesaid wedging

2 action tightly to engage the rims laterally. Both the flange surfaces 20, 20 and the clamp surfaces 22, 22, as well as the rim contact surfaces, are precision machined for alinement and to secure more uniform wedging action. The segmental clamps are preferably made from precipitation hardened Ni-Co-Cr base alloy, such as K-42-B, having exceptional mechanical properties for the clamps, since the latter are quite small. In this connection, the clamps are precision machined for the proper interference with the outer surfaces of the contacting flanges to secure the desired spring fit when the clamps are forced outwardly.

Preferably, each clamp has a screw 23 carried by the associated contacting rims and by means of which the clamps may be pulled out snug, after which the rotor is spun to seat the clamps by centrifugal force, followed by final tightening of the screws.

Figs. 3, 4 and 5 are illustrative of the clamp spring action. In Fig. 3, it will be noted that the flange and channel side surfaces are inclined at slightly different angles with the result that initial contact of a clamp involves interference, the top corners $a-a$ of its side edges engaging the flange side surfaces. Pulling up of a clamp 21 by its screw 23 results in initial deflection, as indicated in Fig. 4. After spinning of the rotor and tightening of the clamp screw, the clamp has undergone maximum deflection, as indicated in Fig. 5, and therefore acts as a spring to keep the rim and flange contact surfaces pressed together.

Fastening discs together in the manner aforesaid gives a rigid structure favorable for high critical speeds and the clamps are forced outwardly by centrifugal force while the unit is operating.

After assembly of the composite rotor in the manner aforesaid, the rotor blading is mounted thereon.

While the invention has been shown in but one form, it will be obvious to those skilled in the art that it is not so limited, but is susceptible of various other changes and modifications without departing from the spirit thereof.

What is claimed is:

1. In a turbine or compressor, a rotor comprising end shafts, discs carried by the end shafts, and blade carrying discs interposed between the end shaft discs; said discs having rims arranged successively in lateral contact and the contacting rims having contacting flanges extending radially inward, each contacting pair of said flanges having a pair of side surfaces which diverge radially outward; and segmental clamps associated with the pairs of contacting flanges, said clamps having channel side surfaces also diverging radially outward and engaging the flange side surfaces, said clamps being operative, under the influence of centrifugal force, to exert clamping action on the contacting flanges to hold the rims in lateral contact.

2. Structure as specified in claim 1, wherein the channel side surfaces of the segmental clamps diverge at a slightly smaller angle than the angle of divergence of the flange side surfaces and hence are operative, under the influence of centrifugal force, to exert spring clamping action on contacting flanges to hold the rims in lateral contact.

3. Apparatus as claimed in claim 1 wherein each clamp is provided with a tightening screw carried by the associated contacting rims.

ERNEST F. MILLER.

REFERENCES CITED

The following references are of record in the file of this patent:

FOREIGN PATENTS

| Number | Country | Date |
|---|---|---|
| 343,462 | Germany | Nov. 2, 1921 |
| 375,363 | Germany | May 12, 1923 |